United States Patent [19]

Tanaka et al.

[11] 4,079,163

[45] Mar. 14, 1978

[54] WELDABLE COATED STEEL SHEET

[75] Inventors: Tadashi Tanaka, Yokohama; Joji Oka, Tokyo; Hideaki Iwakura, Kawasaki, all of Japan

[73] Assignee: Nippon Steel Corporation, Tokyo, Japan

[21] Appl. No.: 634,735

[22] Filed: Nov. 24, 1975

[30] Foreign Application Priority Data

Nov. 29, 1974  Japan ............................... 49-136212
Dec. 28, 1974  Japan ................................. 50-3072

[51] Int. Cl.$^2$ .................... H01B 1/00; B32B 15/08
[52] U.S. Cl. .................................. 428/328; 29/33 B; 29/458; 29/DIG. 38; 29/DIG. 48; 106/288 B; 106/299; 106/302; 252/516; 428/323; 428/336; 428/341; 428/457; 228/203; 228/214
[58] Field of Search ............ 428/457, 323, 328, 341, 428/336; 252/503, 504, 512, 514, 513, 516; 106/290, 299, 302, 288 B, 307; 148/6, 6.2; 427/126; 260/37 M; 29/458, 33 B, DIG. 38, DIG. 48, 195 A, 192 R; 228/203, 214

[56] References Cited

U.S. PATENT DOCUMENTS

| | | | |
|---|---|---|---|
| 2,963,782 | 12/1960 | Donnelly | 29/195 A |
| 3,661,524 | 5/1972 | Holden et al. | 106/299 |
| 3,800,891 | 4/1974 | White et al. | 29/195 A |
| 3,904,555 | 9/1975 | Matsuda et al. | 252/503 |
| 3,989,554 | 11/1976 | Wisler | 29/195 A |

FOREIGN PATENT DOCUMENTS

| | | | |
|---|---|---|---|
| 4,734,578 | 8/1972 | Japan | 29/195 A |
| 385,709 | 6/1973 | U.S.S.R. | 29/195 A |
| 367,989 | 7/1973 | U.S.S.R. | 29/195 A |

*Primary Examiner*—George F. Lesmes
*Assistant Examiner*—Stanley S. Silverman
*Attorney, Agent, or Firm*—Wenderoth, Lind & Ponack

[57] ABSTRACT

A weldable coated steel sheet comprising a steel sheet substrate and a paint coating layer thereon, said paint comprising at least one of the group consisting essentially of titanium carbide, zirconium carbide, hafnium carbide, vanadium carbide, niobium carbide, tantalum carbide, and chromium carbide in the powder form.

18 Claims, 2 Drawing Figures

WELDABLE COATED STEEL SHEET

BACKGROUND OF THE INVENTION

Conventionally it has long been accepted that coated metal sheets, such as coated steel sheets, can not be applied to electric resistance weldings, such as spot welding and seam welding unless for special welding methods and special paints are used, because the coating films are electrically insulating.

As for weldable paints, paints such as zinc-rich paints which contain a large amount of metallic zinc have been known, but these paints do not give satisfactory electric conductivity unless 90% or more of the zinc metal is contained, and due to the large content of the metal, these paints have poor workability and thus have been limited in their applications.

In efforts for solving the difficulties confronted by with the above conventional paints, a method has been proposed in U.S. Pat. No. 3,904,555. According to this method, a mixture of soft metals and hard metals is added to the paint composition and this method has succeeded in lowering the amount of the metal addition.

However, the coated steel sheet according to U.S. Pat. No. 3,904,555 has various defects such that the metal powders themselves contained in the coating layer rust, that the metal powders form a local cell with the steel sheet substrate causing earlier corrosion of the steel sheet substrate, that the metal powders contained in the coating layer react with the welding electrode to form an alloy of the powder metal and electrode metal on the electrode surface, and that the metal powders are oxidized and edhere to the welding electrode, thus causing consumption of the electrode.

SUMMARY OF THE INVENTION

The present invention is an improvement of the conventional art and has its object to provide a coated steel sheet having excellent weldability, coated with a novel weldable paint composition having good electric conductivity.

The above object of the present invention is attained by a feature that a weldable paint composition containing at least one of metal carbides such as TiC, ZrC, HfC, Vc, NbC, TaC, $Cr_3C_2$, WC, and $Mo_2C$ in the powder form is applied on the metal sheet.

Further, the present invention has for its object, the provision of a coated steel sheet having excellent corrosion resistance and weldability, which can give improved corrosion resistance against rust formation due to damages of the coating of the above weldable paint composition, and this object is attained by using a zinc plated steel sheet.

The features of the present invention may be summarized below.

(1) a weldable coated steel sheet comprising a steel sheet and a weldable paint composition layer coated on the steel sheet and containing as an essential component at least one of carbides in the powder form of titanium, zirconium, hafnium, vanadium, niobium, tantalum, chromium, tungsten, and molybdenum.

(2) a weldable coated steel sheet comprising a steel sheet and a weldable paint composition layer coated on the steel sheet, said paint composition containing at least one of the carbides in the powder form of titanium, zirconium, hafnium, vanadium, niobium, tantalum, chromium, tungsten and molybdenum, and at least one of metal powders of zinc, aluminum, copper, iron, nickel, cobalt, manganese, chromium and tin, optionally with the addition of a pigment.

(3) a corrosion resistant and weldable coated steel sheet comprising a steel sheet plated with zinc in an amount of not less than 1 $g/m^2$, and a weldable paint composition layer coated on the zinc plated steel sheet, said paint composition containing at least one member of the group consisting of iron, nickel, cobalt, manganese, chromium and their alloys, at least one of the carbides of titanium, zirconium, hafnium, vanadium, niobium, tantalum, chromium, tungsten, molybdenum and their mixture, at least one member selected from the group consisting of aluminum, graphite and tin, and zinc powder in an amount of not less than 5% by weight based on the total content of nonvolatile matters in the paint composition.

(4) a corrosion resistant and weldable coated steel sheet comprising a steel sheet electro-plated with zinc in an amount of not less than 1 $g/m^2$, and a paint composition layer coated in an amount of 5–20$\mu$ on the zinc plated steel sheet, said paint composition containing at least one member of the group consisting of iron, nickel, cobalt, manganese, chromium and their alloys, at least one member of the carbides of titanium, zirconium, hafnium, vanadium, niobium, tantalum, chromium, tungsten, molybdenum and their mixture, at least one member selected from the group consisting of aluminum, graphite and tin, and zinc powder in an amount of not less than 5% by weight based on the total content of nonvolatile matters in the paint composition, said electro-zinc plating, paint composition coating and baking being performed in one process line.

DETAILED DESCRIPTION OF THE INVENTION

The present invention will be described in details herein below referring to the attached drawings.

BELIEF EXPLANATION OF DRAWINGS

Figure 1:
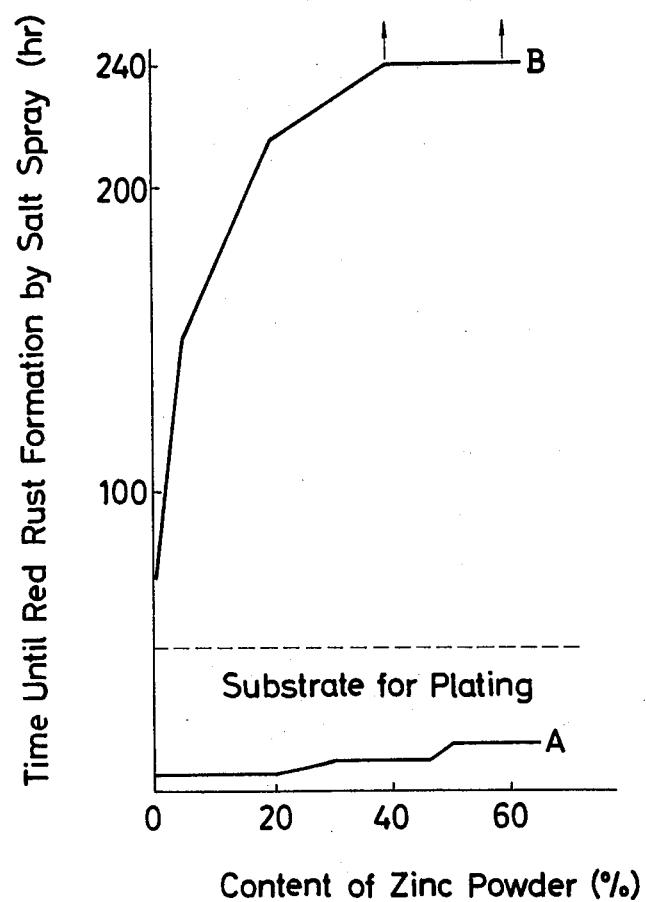
FIG. 1 shows relation between the content of zinc powder in the paint composition layer and the time until formation of red rust caused by salt spray test.

Description will be made on the paint composition to be coated on the steel sheet according to the present invention.

The carbides contained in the paint composition have a Vickers hardness ranging from 1000 to several thousands, and thus far harder than a hard metal such as iron and nickel, and show a specific resistance ranging from 20 to 100$\mu\Omega$cm which is slightly higher than that of a metal, but lower that that of graphite which has been known well as conductive powder material. When these carbides are admixed into the paint, a paint coating in which the carbide powders are uniformly dispersed is formed, and when a metal sheet, for example steel sheet, having such paint coating is welded by spot welding, the paint coating is compressed and deformed by the welding force exerted by the welding electrode, while the carbide powders are not deformed due to their high hardness and break the paint coating, thus affording continuous connection between the steel sheet substrate and the welding electrode. Under this condition, the carbide powders show electric conductivity similar to that of a metal so as to facilitate the current passage and the welding. Naturally, when a metal powder, such as aluminum, zinc, copper, iron, nickel, cobalt, chromium, and tin powders, is admixed to the paint in addition to the carbide powder, the current passage is faciliated still more. However, according to the present invention, even when only one or more of the carbides is admixed to the paint, similar or better results than those obtained by the prior art disclosed in U.S. Pat. No. 3,904,555 where both conductive soft metal powders and hard metal powders are added can be obtained. This is one of the advantages of the present invention.

Secondly, since these carbide powders are chemically stable, even if the paint coating is subjected to corrosive media the carbide powders do not dissolve or rust so that there is no danger of deterioration of the paint coating.

Whereas according to the prior arts in which metal powders are used, these metal powders easily rust so that red rust, white rust or blue rust flow out of the paint coating, thus damaging the appearance of the coated steel sheet and deteriorating the paint coating itself.

As mentioned hereinbefore, metal powders may be admixed together with the carbides in the present invention. Even in this case, it is possible that the amount of the metal powder to be admixed is smaller than that required when only the metal powders are used so that desired results can be obtained.

Thirdly, the carbide powders admixed in the paint has excellent resistance against the heat caused by spot welding, seam welding and the like. In case of a weldable coated steel sheet coated with a conventional paint composition containing metal powders alone, the metal powders are melted or oxidized by the heat generated by passage of a high level of current during the electric resistance welding such as spot welding, seam welding and the like so that metals or metal oxides pick up onto the welding electrode, which cause lowering of the welding efficiency.

Whereas according to the present invention, since the carbides have a high melting point and excellent resistance against oxidation, the phenomena as mentioned just above do not take place so that the welding operation can be continued consistently for a long period. This fact is very important when the welding operation is automatically done at a high speed as nowadays. This advantage can be attained when the metal powders are admixed to the paint composition together with the carbide powders.

Fourthly, the paint composition according to the present invention is very stable. When metal powders are admixed in the paint composition, the metals react with carboxylic acids contained in the paint resins to cause often gelatinization or solidification of the paint. In order to avoid this, it has been practised to admix the metal powders to the paint just before the paint application, or to select resins having no reactive groups such as the carboxylic group.

Since the chemical reactivity of the carbides admixed in the paint composition used in the present invention is remarkably small, the chemical reaction mentioned just above and the gelatinization of the paint do not take place so that the paint composition can be stored for a long period without danger of denaturation. Thus, according to the present invention there is no specific limitation on the resins to be used, and an appropriate resin can be selected without restriction from the points of physical properties and corrosion resistance of the paint layer.

The paint composition used in the present invention is a weldable paint composition which contains as essential components a resin vehicle and metal carbide powder, and optionally metal powders, rust-preventive pigment and coloring pigment.

As for the paint resin vehicle, all types of resin vehicles including resins which are dryable at ordinary temperature, thermosetting resins, radiation-curable resins and the like may be employed.

As for the metal carbide, TiC, ZrC, HfC, Vc, NbC, TaC, $Cr_3C_2$, WC and $Mo_2C$ as well as graphite may be employed. Although there is no limitation on the amount of these metal carbides to be admixed to the paint composition, 3-95% by weight on the basis of the total weight of the nonvolatile matters in the paint composition is most effective. Beyond 95%, the paint adhesion during workings of the coated steel sheets lowers and the flowability of the paint lowers, thus causing difficulties in operation. On the other hand, when the content of the metal carbide is lower than 3%, the welding conditions are limited and thus there is danger of failures of welding.

Regarding the particle size of the metal carbide, a larger particle size is advantageous for the weldability, but too large a particle size will cause rough coating appearance. A particle size not larger than 200 mesh is preferable, and a particle size not larger than 400 mesh is most preferable.

As for the metal powders to be used together with the metal carbides, selection may be made among zinc, aluminum, copper, iron, nickel, cobalt, chromium, tin and the like in view of the requirements in individual applications such as for improved electric conductivity and corrosion resistance. Admixing of zinc powder not less than 5% on the basis of the total nonvolatile matters in the paint is most preferable.

It is desirable the metal powder is added in an amount ranging from 5 to 90%, because an addition lower than 5% does not assure good electrical conductivity, while a addition beyond 90% deteriorates the workability.

As for the rust-preventive pigments, they may be added for desired rust prevention effects.

Further according to the present invention, as stated herein before, the steel sheet to be coated with the above paint composition is zinc-plated in an amount of not less than 1 g/m$^2$ before the paint coating for the purpose of improving resistance against rust formation caused due to damages of the paint coating layer.

Thus, the corrosion resistant and weldable coated steel sheet according to the present invention comprises a steel sheet substrate plated with zinc in an amount of not less than 1 g/m$^2$ and a paint composition coated on the zinc plated steel sheet, said paint composition containing at least one member selected from the group consisting of iron, nickel, cobalt, manganese, chromium, and their alloys, at least one member selected from the group consisting of carbides of titanium, zirconium, hafnium, vanadium, niobium, tantalum, chromium, tungsten, molybdenum, and carbides of their mixtures, at least one selected from the group consisting of aluminum, graphite and tin, and zinc powder in an amount of not less than 5% on the basis of the total content of nonvolatile matters in the paint.

Zinc plating has been widely known as a rust preventive treatment for steel sheet articles. However, it has been also generally known that when a zinc plated steel sheet is subjected to corrosion by salt spray, the zinc dissolves out at a rate of 1 g/m² per hour so that the steel sheet is attacked and so-called red rust occurs.

Meanwhile, zinc-rich paints which have been used for rust prevention of a steel rust sheet must contain more than 85%, preferably more than 95% of zinc powder in order to assure satisfactory rust prevention. However, such a large content of the zinc powder causes fair flowability of the paint, and when a steel sheet coated with the zinc-rich paint is bent or pressed, the paint coating cracks or peels off.

The coated steel sheet according to the present invention has solved the above defects.

Detailed descriptions will be made referring to FIG. 1.

The curve A in FIG. 1 represents the time required until red rust is formed by a salt spray test on a coated steel sheet directly coated with paint compositions of different zinc contents and having scratches through the paint coating to the steel sheet substrate. The curve B represents the results obtained by a similar test, except that a zinc-plated steel sheet having 3 g/m² zinc coating is used.

In view of the fact that red rust occurred in 48 hours in case of a zinc-plated steel sheet having 3 g/m² zinc coating but having no paint coating in spite of the chromate treatment, it is clearly understood that the coated steel sheet according to the present invention show remarkably excellent corrosion resistance. In this connection, it should be noted that the corrosion resistance thus obtained is not mere physical combination of the corrosion resistance obtained by the zinc plating itself and the corrosion resistance obtained by the zinc powder contained in the paint composition, but it is a synergistically improved corrosion resistance.

The effect by the zinc plating begins to appear with a zinc plating amount of 1 g/m² or more. There is no upper limit for the zinc plating amount, but the weldability tends to lower as the zinc plating amount increases and swelling at the damaged portions of the paint coating becomes noticeable. In view of these facts, zinc plating of not more than 60 g/m² is desirable, and where weldability is strongly demanded, zinc plating of not more than 20 g/m², preferably not more than 3 g/m² is recommendable.

As for the content of zinc powder in the paint composition, a zinc powder content less than 5% does not give any substantial improvement of corrosion resistance, and thus a zinc powder content of not less than 5% is necessary and a zinc powder content of not less than 40% is preferable.

According to the present invention, the thickness of the paint coating may be preferably from about 7 to about 15μ, although a coating thickness outside the above range may give the desired results. However, with a coating thickness less than 7μ, it is difficult to obtain a uniform coating film free from defects and thus fully satisfactory corrosion resistance can not be assured. On the other hand, with a coating thickness beyond 15μ, the welding conditions are limited although still improved corrosion resistance can be obtained.

Also there is no special limitation on the paint vehicles used in the present invention, and synthetic resin vehicles, such as acrylic resins, vinyl resins, polyester resins, alkyd resins, and butadiene, stylene, phtalic acid, urethane and epoxy resins, as well as natural resins and oily vehicles may be used.

DESCRIPTION OF PREFERRED EMBODIMENTS

The present invention will be understood more clearly from the following embodiments. It should be noted, however, the present invention is not limited to the embodiments.

Examples 1–4 show embodiments in which a steel sheet having no zinc plating is used.

Examples 5–7 show embodiments in which a zinc-plated steel sheet is used.

Example 8 illustrates one embodiment of a method for producing the coated steel sheet according to the present invention.

EXAMPLE 1

A paint composition containing an Epoxy resin vehicle (as nonvolatile matter)

| | |
|---|---|
| TiC (500 mesh) | 30 weight parts |
| | 70 weight parts |
| Solvent | 50 weight parts | was applied to a thickness of 10μ on a cold rolled steel sheet of 0.8 mm thickness, and after curing, the coated steel sheet was subjected to spot welding under the following conditions.

| | |
|---|---|
| Welding force | 250 Kg |
| Current | 7 KA |
| Current passage time | 10 ∞ |
| Electrode | 4.5 mm diameter RWMA-2 |

As a result, a nugget having a tensile strength similar to that obtained by welding a cold rolled steel sheet under the same welding conditions as above. The welding was one under the same conditions continuously for 2000 points and a good nugget was formed without pick-up of oxides etc. onto the electrode.

EXAMPLE 2

A paint composition containing an epoxy resin vehicle (as nonvolatile matter)

| | |
|---|---|
| TiC (500 mesh) | 70 weight parts |
| | 10 weight parts |
| Zinc | 20 weight parts |
| Solvent | 30 weight parts | was coated to a thickness of 10μ on a cold rolled steel sheet of 0.8 mm thickness, and after curing, the coated steel sheet was welded by spot welding under the following conditions;

| | |
|---|---|
| Welding force | 250 Kg |
| Current | 8 KA |
| Current passage time | 10 ∞ |
| Electrode | 4.0 mm diameter RWMA-2 |

The welding was done continuously for 700 points and a good nugget was formed.

EXAMPLE 3

A paint composition containing a polyester resin vehicle (as nonvolatile matter)

| | |
|---|---|
| | 15 weight parts |

-continued

| | |
|---|---|
| WC (500 mesh) | 85 weight parts |
| Solvent | 50 weight parts | was coated to a thickness of 10μ on a cold rolled steel sheet of 0.8 mm thickness, and after curing, the coated steel sheet was seam welded under the following conditions and a seam as good as that obtained in case of seam welding of a cold rolled steel sheet was obtained.

| | |
|---|---|
| Welding force | 400 Kg |
| Current | 15 KA |
| Current passage time | 4 – 2 ∞ |
| Electrode | Knurled gear type RWHA-2 |

EXAMPLE 4

A paint composition containing a thermalsetting acrylic vehicle (as nonvolatile matter)

| | |
|---|---|
| | 50 weight parts |
| TaC (400 mesh) | 50 weight parts |
| Solvent | 50 weight parts | was coated to a thickness of 10μ on a cold rolled steel sheet of 0.8 mm thickness, and after curing, the coated steel sheet was spot-welded under the same conditions as in Example 1 and a good nugget was formed.

EXAMPLE 5

A steel sheet of 0.8 mm thickness having a electric zinc plating of 3 g/m² on the surface thereof was subjected to chromate treatment, and then a paint having the following composition was coated to a thickness of 10μ on the zinc plated steel sheet.

Epoxy resin vehicle (as nonvolatile matter)

| | |
|---|---|
| | 100 weight parts |
| Iron powder | 120 weight parts |
| Aluminum powder | 18 weight parts |
| Zinc powder | 55 weight parts |
| Solvent | 200 weight parts |

The paint coated steel sheet thus obtained was spot-welded under the standard welding conditions for a cold rolled steel sheet as set forth below and, a satisfactory nugget was formed showing a tensile strength of 350 Kg.

| | |
|---|---|
| Welding force | 250 Kg |
| Current | 7 KA |
| Current passage time | 10 ∞ |
| Electrode | 4.5 mm diameter RWMA-2 |

Also, the coated steel sheet was subjected to salt spray test, and results revealed that no red rust was formed after 250 hours both on the planar portions and the scratched portions, and remarkably excellent corrosion resistance was shown.

EXAMPLE 6

A steel sheet of 0.8 mm thickness having zinc plating of 20 g/m² was subjected to zinc phosphate treatment and then coated with the paint having the composition set below and cured.

Epoxy resin vehicle (as nonvolatile matter)

| | |
|---|---|
| | 33 weight parts |
| Titanium carbide powder | 20 weight parts |
| Aluminum powder | 4 weight parts |
| Zinc powder | 5 weight parts |
| Solvent | 70 weight parts |

The paint coated steel sheet thus obtained was spot-welded under the same conditions as in Example 5, and a good nugget was formed, showing a tensile strength of 300 Kg.

Also the results of salt spray tests revealed no red rust after 240 hours both on the planar portions and the scratched portions.

EXAMPLE 7

A zinc electroplated steel sheet of 0.8 mm thickness having zinc plating of 2 gm/² on the surface thereof was subjected to chromate treatment, and then coated with a paint having a composition as set forth below in 10μ, and cured.

Epoxy resin vehicle (as nonvolatile matter)

| | |
|---|---|
| | 33 weight parts |
| Zinc powder | 70 weight parts |
| Aluminum powder | 4 weight parts |
| Tungsten carbide | 3 weight parts |
| Solvent | 70 weight parts |

The paint coated steel sheet thus obtained was spot-welded under the same conditions as in Example 5, and satisfactory welding results were obtained.

Also the results of salt spray tests on the paint coated steel sheet revealed that no red rust occurred after 200 hours, and remarkably excellent corrosion resistance was obtained as compared with that of the same steel sheet substrate but having no paint coating or having no zinc plating.

EXAMPLE 8

This example illustrates one embodiment for a method for producing the coated steel sheet according to the present invention.

Figure 2:
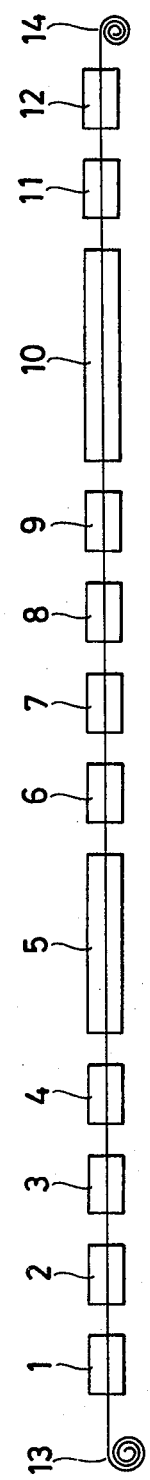
FIG. 2 illustrates one embodiment of the production line for the coated steel sheet of the present invention.

In FIG. 2, 13 is an uncoiler to which the steel strip coil to be treated is mounted. The steel strip coil is a cold rolled steel strip coil which has been prepared by cold rolling, annealing and temper rolling, or a hot rolled steel strip coil which has been discoiled after the hot rolling. The steel strip material is selected depending on the final applications of the coated steel sheet. The steel strip uncoiled from the uncoiler 13 is introduced to the pretreatment equipments 1-4 through a cutter, a welder a looper etc.

The pretreatment equipments including a degreasing tank 1, a rinsing tank 2, an acid pickling tank 3 and a rinsing tank 4, and used for performing degreasing and acid pickling in a manner suitable as pretreatments for plating. For example, the treatments may be done by immersion, spraying or electrolysis, and the present invention is not limited to any specific type of the method.

The pretreated steel coil is subjected to zinc electroplating in the plating tank 5 containing an acidic or alkaline plating bath, and the plating tank may be of a vertical type or a horizontal type.

The plating amount should be selected depending on the applications of the final coated steel sheets, but at least 1 g/m² of plating is necessary for the side to be paint coated.

When the both sides of the steel sheet are to be paint coated, the both sides should be zinc plated in an amount of 1 g/m² or more depending on the desired corrosion resistance. Meanwhile when only one side of the steel sheet is to be paint coated, the side not to be paint coated may be zinc plated in an amount not more than 3 g/m².

When the plating operation is completed, the plated steel coil is rinsed in the rinsing tank 6, subjected to chromic acid treatment, or phosphate treatment in a chemical conversion tank 7, and dried in a dryer 8.

The conversion treatment is done for the purpose of improving corrosion resistance and paint adhesion.

Then, the steel coil is coated with the weldable paint by means of a paint coater 9. The coating may be performed by roll coating, spray coating, or curtain coating for example.

The paint coating is given in a thickness ranging from 5 to 20μ, preferaby 7 to 15μ. With a paint coating thickness less than 5μ, it is difficult to coat the steel strip uniformly, while with a paint coating thickness beyond 20μ, the weldability lowers.

The paint coated steel coil is baked under prescribed conditions in a baking furnace 10, water cooled in a cooling tank 11, dried by means of a dryer 12, passed through a cutter and a looper (not shown) and coiled on a coiler 14, or cut by a cutter (not shown) into cut pieces and piled.

The cooling tank 11 is provided with a grinding device for grinding the strip surface to grind off the zinc plating layer adhering to the side not to be paint coated, and to expose the steel surface.

According to the above embodiment, the zinc plating equipment and the paint coating equipment are arranged in one process line, and a corrosion resistance and weldable paint coated steel sheet having an underlying zinc plating layer and a weldable paint coating layer thereon can be obtained by only one pass of the steel strip through the process line. This is remarkably advantageous over the conventional art in which a zinc plated steel substrate is paint coated in an ordinary coating line, and it has been necessary to pass the steel sheet through two process lines, the zinc plating line and the paint coating line, so that the production cost is high, and there is a large tendency of the shape collapse of the steel sheet as well as danger of damages on the coil during its transfer from the zinc plating line and the coating line.

Further according to the above embodiment, advantage is remarkable when a one-side coated steel sheet is produced. It is often required that one side of the weldable paint coated steel sheet is not paint coated at all. In such a case, only one side of the steel strip is coated by means of the coater 9, and the zinc plating layer on the non-coated side can be easily ground off by the grinder provided in the cooling tank 11.

According to a conventional art for producing a weldable coated steel sheet as disclosed in Japanese patent publication Sho No. 47-6882, a cold rolled steel sheet etc. is used as a substrate so that in case of one-side coating the non-coated side is oxidized in the baking furnace, causing a bluing problem and rust formation during the process.

Whereas according to the above embodiment of the present invention, as the zinc layer adheres to the non-coated side until the last step of the process line, there is no problem of rust formation and bluing. It is also possible to retain the zinc plating layer on the noncoated side for final uses.

What is claimed is:

1. A weldable coated steel sheet comprising a steel sheet substrate and a paint coating layer of 5–20μ thickness thereon, said paint comprising a resin vehicle and at least one member selected from the group consisting of titanium carbide, zirconium carbide, hafnium carbide, vanadium carbide, niobium carbide, tantalum carbide and chromium carbide in powder form, said member having a Vickers hardness of at least 1000 and being used in an amount sufficient to render the coated steel sheet weldable.

2. A weldable coated steel sheet according to claim 1, wherein the paint further comprises at least one member selected from the group consisting of zinc, aluminum, copper, iron, nickel, cobalt, manganese, chromium and tin in the form of metal powder.

3. A weldable coated steel sheet according to claim 2, in which the amount of the metal powder contained in the paint ranges from 5 to 90% on the basis of the total weight of nonvolatile matter of the paint.

4. A weldable coated steel sheet according to claim 1, in which the carbide powder has a particle size not larger than 200 mesh.

5. A weldable coated steel sheet according to claim 1, wherein the carbide contained in the paint ranges from 3 to 95% on the basis of the total weight of the nonvolatile matter in the paint, and wherein the paint further comprises at least one member selected from the group consisting of zinc, aluminum, copper, iron, nickel, cobalt, manganese, chromium and tin in the form of metal powder, in which the metal powder is present in amounts of from 5 to 90% in the basis of the total weight of nonvolatile matter in the paint.

6. A weldable coated steel sheet according to claim 5, in which the carbide powder has a particle size not larger than 200 mesh.

7. A weldable coated steel sheet according to claim 1, in which the amount of the carbide powder contained in the paint ranges from 3 to 95% on the basis of the total weight of nonvolatile matters of the paint.

8. A weldable coated steel sheet according to claim 7, wherein the carbide powder is titanium carbide.

9. A weldable coated steel sheet according to claim 7, wherein the carbide powder is zirconium carbide.

10. A weldable coated steel sheet according to claim 7, wherein the carbide powder is hafnium carbide.

11. A weldable coated steel sheet according to claim 7, wherein the carbide powder is vanadium carbide.

12. A weldable coated steel sheet according to claim 7, wherein the carbide powder is niobium carbide.

13. A weldable coated steel sheet according to claim 7, wherein the carbide powder is tantalum carbide.

14. A weldable coated steel sheet according to claim 7, wherein the carbide powder is chromium carbide.

15. A corrosion resistant and weldable coated steel sheet comprising a steel sheet plated with zinc in an amount of not less than 1 g/m², and a weldable paint composition layer in a thickness of 5 to 20μ coated on the zinc plated steel sheet, said paint composition containing a resin vehicle and (1) at least one member selected from the group consisting of iron, nickel, cobalt, manganese, chromium and their alloys in powdered form, (2) at least one member selected from the group consisting of the carbides of titanium, zirconium, hafnium, vanadium, niobium, tantalum, chromium, tungsten, molybdenum and mixtures thereof in powdered form having a Vickers hardness of at least 1000, (3) at least one member selected from the group consisting of aluminum, graphite and tin in powdered form, and (4) zinc powder in an amount of not less than 5% by weight based on the total content of non-volatile matters in the paint composition.

16. A corrosion resistant and weldable coated steel sheet according to claim 15, in which the weldable paint composition contains the metal component (1) in amounts ranging from 5-90% and the carbide component (2) in amounts from 3-95%, said percentages being each based upon the total weight of nonvolatile matter in the paint.

17. A corrosion resistant and weldable coated steel sheet comprising a steel sheet electroplated with zinc in an amount of not less thn 1 g/m$^2$, and a paint composition layer coated in an amount of 5-20$\mu$ on the zinc plated steel sheet, said paint composition containing a resin vehicle and (1) at least one member selected from the group consisting of powders or iron, nickel, cobalt, manganese, chromium and their alloys, (2) at least one member selected from the group consisting of powders of carbides of titanium, zirconium, hafnium, vanadium, niobium, tantalum, chromium, tungsten, molybdenum and mixtures thereof, said carbides having a Vickers hardness of at least 1000, (3) at least one member selected from the group consisting of powders of aluminum, graphite and tin, and (4) zinc powder in an amount of not less than 5% by weight based on the total content of nonvolatile matter in the paint composition, said electrozinc plating, paint composition coating and baking being performed in one process line.

18. A corrosion resistant and weldable coated steel sheet according to claim 7, in which the weldable paint composition contains the metal component (1) in amounts ranging from 5-90% and the carbide component (2) in amounts from 3-95%, said percentages being each based upon the total weight of nonvolatile matter in the paint.

* * * * *